United States Patent [19]

Bezos et al.

[11] Patent Number: 4,862,433

[45] Date of Patent: Aug. 29, 1989

[54] TIMER CIRCUIT FOR DRAG OPERATION IN AN ENGINEMAN MONITORING DEVICE

[75] Inventors: Angel P. Bezos, Rockville, Md.; Emilio A. Fernandez, McLean, Va.

[73] Assignee: Pulse Electronics, Inc., Rockville, Md.

[21] Appl. No.: 306,860

[22] Filed: Feb. 7, 1989

[51] Int. Cl.⁴ .............................................. G04F 8/00
[52] U.S. Cl. .................................... 368/108; 340/575
[58] Field of Search ........................ 368/10, 107–113; 246/6, 7, 14, 15, 108, 110, 167 R, 191; 340/575, 576, 901, 905

[56] References Cited

U.S. PATENT DOCUMENTS 4,196,412  4/1980  Sluis et al. ............................ 340/575

Primary Examiner—Vit W. Miska
Attorney, Agent, or Firm—Whitham & Marhoefer

[57] ABSTRACT

An improved timer circuit for engineman monitoring devices allows a "drag operation" without frequent operation of the audio/visual alarms of the monitoring devices. The circuit receives an input from an existing switch in the locomotive to select the drag input state, but this input state does not necessarily select a longer time period for the reset window. More particularly, if drag is off and the speed is between approximately ⅓ and 3½ mph, the timeout period is long (e.g., 123 seconds), but if drag is on for this speed, the timeout period is doubled (e.g., 246 seconds). Over 3½ mph, the state of the drag switch is ignored, and the timeout period is long until a predetermined speed is reached and thereafter decreases with increasing speed. In addition, at "zero" speed, i.e., below ⅓ mph, the timeout period is reduced to 20 seconds to prevent defeat of the system by tampering with the axle drive wires.

10 Claims, 2 Drawing Sheets

TIMER CIRCUIT FOR DRAG OPERATION IN AN ENGINEMAN MONITORING DEVICE

BACKGROUND OF THE INVENTION

1. Field of the Invention

The present invention generally relates to electronic devices designed to enhance the safe operation of railway vehicles by monitoring the alertness of the engineman, i.e., so-called "dead man" devices, and more particularly to an improved timer circuit for such devices which allows a "drag operation", such as occurs when gondola cars are slowly dragged past a loading station, without frequent operation of the audio/visual alarms.

2. Description of the Prior Art

Electronic devices are known which monitor in an unobtrusive manner the actions taken by an engineman in controlling a locomotive of a train. After a predetermined period in the absence of detectable control movements, the system requests an acknowledgment from the engineman by means of audio/visual alarms. Failure to acknowledge results in a power-down sequence which ultimately brings the vehicle to a safe and complete stop.

One such product is sold by Pulse Electronics, Inc., of Rockville, Md., under the trademark of "Train Sentry II" as described in Bulletin 10781-B entitled "Train Sentry II Operating Instructions", revised May 28, 1986. The "Train Sentry II" is composed of a light-/horn box located near the control stand in the locomotive cab and a control box mounted elsewhere. Each subsystem contains a timer and a distance counter, both of which are programmable and either one can trigger the warning and stop sequence. The timer stores the time elapsed since the last reset. The distance counter stores a distance since last reset. The timer controls at lower speeds, while at higher speeds, the distance counter controls. If the time interval or the distance reaches predetermined programmed values, the system assumes that the engineman is disabled and asks him, by means of rapidly pulsating lights and warning horns, to acknowledge. The intermittent action of the warning devices gradually increases in intensity and if, at the end of the warning period the engineman has not responded, the equipment concludes that he is disabled and de-energizes a normally closed magnetic air valve connected to the air brake system. This action establishes a well controlled power-down sequence that results in stopping the train.

The time required for the system to request an acknowledgement is factory programmed in accordance to customer specifications. FIG. 1 presents a specific example of the timing functions. The time sequence is described by the following examples with reference to FIG. 1. Between 0 and 3 mph, the reset window is 20 seconds. This is to prevent tampering with the device such as cutting the wires from the speed sensor. For train speeds between 3 and 20 mph, the reset window is 120 seconds. Above 20 mph, the reset window is computed as a function of speed, and in the specific example illustrated, it is 2400 divided by the speed in mph. It will, of course, be understood that the values given in this example are merely illustrative and, in fact, are programmable. Resets to the equipment are generated as a result of monitored actions of the engineman, such as operating the throttle, brakes, horn and the like. Every time a reset is received by the equipment, the timers are reset to zero thereby waving the need for the engineman to acknowledge. When an acknowledgement is required by the engineman, the acknowledgement acts as a manual reset.

The reset window timing illustrated in FIG. 1 is optimal for most railroad operations. There is, however, a special case where the window timing has proved to be an irritant to enginemen and that is the case of a so-called "drag" operation of the type where a long train of gondola cars is being loaded with, for example, coal. In this operation, the gondola cars are slowly "dragged" past a loading station at a speed such that each car will be fully loaded by the time it passes the loading station. During this operation, the speed of the train is very slow, normally about one mph, and there are minimal functions the engineman must perform. As a result, the times between monitored actions can be quite long unnecessarily activating the warning lights and horns and requiring the engineman to acknowledge. The problem is made all the worse by the 20 second reset window for speeds between 0 and 3 mph.

A straight forward solution to this problem might simply be to provide the engineman monitoring device with either a disable switch or a switch to increase the time period of the reset window. However, neither of these solutions are acceptable for reasons of safety. These devices must always be fully operational no matter what operation is being performed; therefore, a disable switch is not a good solution. Moreover, a switch to increase the time period of the reset window could be a safety hazard if the engineman forgets to, or intentionally does not, reset the switch to the regular reset window operation. Further, it has been observed that some enginemen do not like the monitoring devices and will sometimes resort to extreme measures to disable the devices.

SUMMARY OF THE INVENTION

It is therefore and object of the present invention to provide an improved timer circuit for engineman monitoring devices which allows a "drag operation" without frequent operation of the audio/visual alarms.

According to the invention, the improved timer circuit receives an input from an existing switch in the locomotive to select the drag input state, but this input state does not necessarily select a longer time period for the reset window. More particularly, if drag is off and the speed is between approximately ½ and 3½ mph, the timeout period is long (e.g., 123 seconds), but if drag is on for this speed, the timeout period is doubled (e.g., 246 seconds). Over 3½ mph, the state of the drag switch is ignored, and the timeout period is long until a predetermined speed is reached and thereafter decreases with increasing speed.

BRIEF DESCRIPTION OF THE DRAWINGS

The foregoing and other objects of the invention will be better understood from the following detailed description of a preferred embodiment of the invention with reference to the drawings, in which.

DETAILED DESCRIPTION OF A PREFERRED EMBODIMENT OF THE INVENTION

Figure 1:
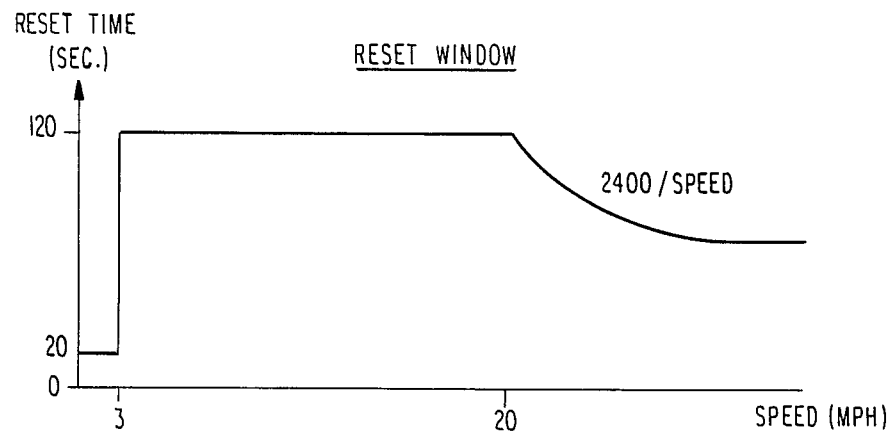
FIG. 1 is a graph showing the time profile of the reset window of the prior art engineman monitoring device.
Figure 2:
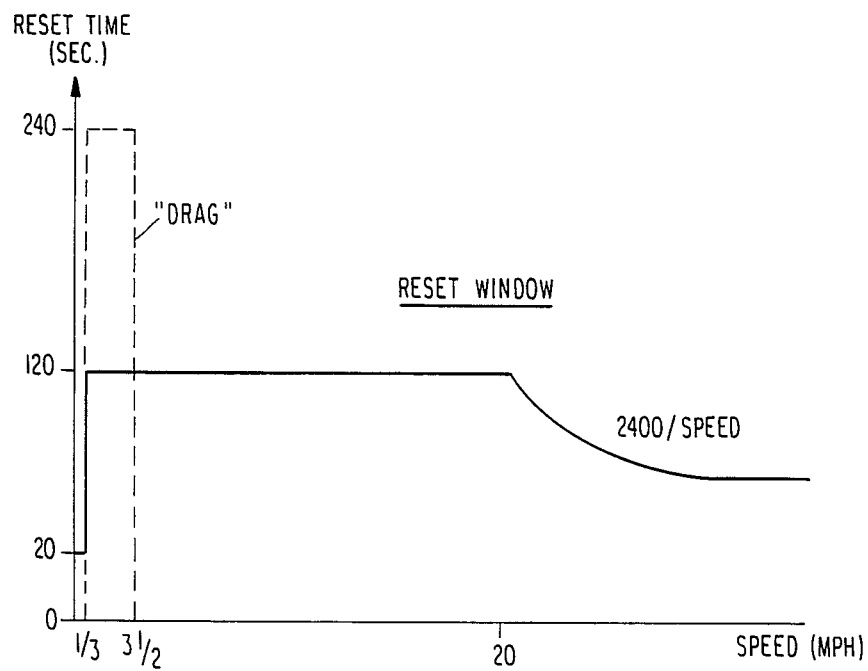
FIG. 2 is a graph, similar to FIG. 1, showing the modified time profile according to a preferred embodiment of the invention.

Referring now to the drawings, and more particularly to FIG. 2, there is shown the time profile of the engineman monitoring device according to a preferred embodiment of the invention. This time profile is generally similar to that of the prior art shown in FIG. 1; however, the dotted line shows the operation when the drag input has been selected by the engineman. Specifically, it will be observed that between approximately ⅛ and 3½ mph, the timeout period is doubled to 246 seconds when there is a drag input. Below ⅛ mph and above 3½ mph, the drag input has no effect on the original time profile of the reset window. This is because below ⅛ mph the train is assumed to be stopped and therefore not in a drag operation even though the system is receiving a drag input, and above 3½ mph the train is moving too fast to be legitimately in a drag operation and the drag input should be ignored. The lower threshold of ⅛ mph is set higher than zero purposely so that the system cannot be defeated by someone tampering with the axle drive wires, as by disconnecting or shorting. Note that below a speed of ⅛ mph, the timing is set to 20 seconds. Thus, no input or an input less than ⅛ mph from the axle drive will result in energizing the warning lights and horns every 20 seconds.

Figure 3:
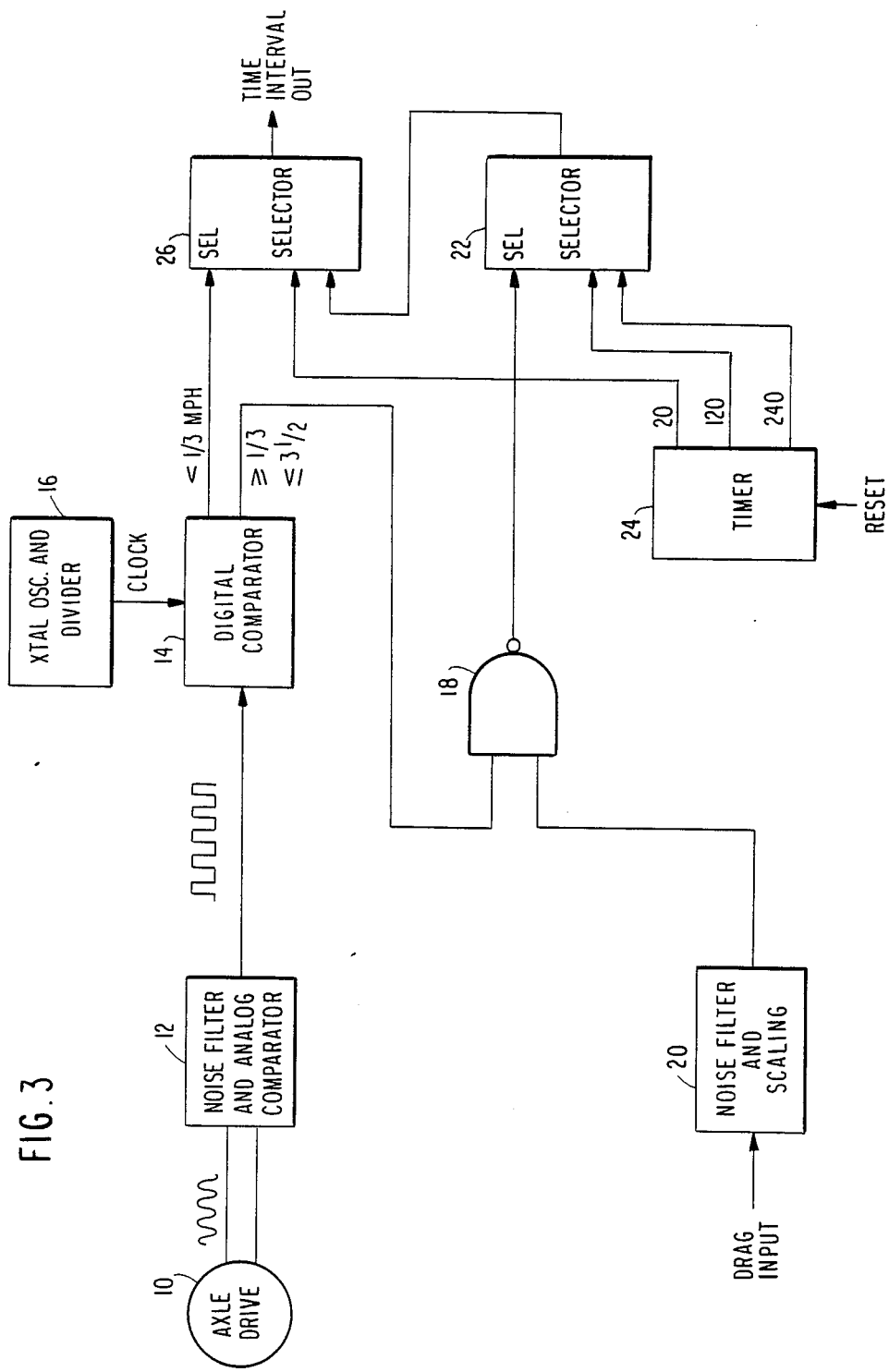
FIG. 3 is a block diagram of the improved timer circuit for an engineman monitoring device according to the invention incorporating the "drag" feature.

FIG. 3 shows the basic components in block diagram form. The circuit comprises an axle drive signal generator 10 which produces a low amplitude sinusoidal wave signal having a frequency proportional to the speed of the locomotive. This signal is supplied to a noise filter and analog comparator 12 which produces a square wave output signal of the same frequency. The square wave signal is, in turn, supplied to a digital comparator 14 which compares the square wave signal with a clock signal from a precision crystal oscillator and divider circuit 16. The digital comparator 14 generates an output whenever the speed of the locomotive is between ⅛ and 3½ mph. This output enables NAND gate 18, the second input to which is the drag input. This drag input is supplied by an existing switch (not shown) in the locomotive, and for purposes of this circuit, a noise filter and scaling circuit 20 is interposed between the switch and the NAND gate 18. Thus, the output of the NAND gate goes low only when enabled by the output of the digital comparator 14 and the drag switch is actuated; otherwise, the output of the NAND gate 18 remains high.

The output of the NAND gate 18 is supplied as the select input to a selection circuit 22, which may be, for example, an integrated circuit (IC) multiplexer switch. This selection circuit has two inputs, only one of which is connected to its output at any point in time. The two inputs are provided by a timer circuit 24, which may be implemented with a precision clock oscillator, a counter and decoder logic. One of the outputs from the timer is a clock signal marking 120 second time intervals, and the other output is a clock signal marking 240 second time intervals. The timer circuit 24 is reset by the monitoring circuit whenever a monitored engineman action occurs or in response to an acknowledgement from the engineman following warning audio and visual signals. Thus, in normal operation, the selection circuit provides no output no matter which input is selected by the output of NAND gate 18, since the timer circuit 24 will be reset before either a 120 second time interval pulse output or, in drag operation, a 240 second time interval pulse output is generated.

The output of the selection circuit 22 is supplied to a second selection circuit 26 as a first input. The second input to the selection circuit 26 is provided by the timer 24, this input being a 20 second time interval. The select input to the selection circuit 26 is provided by a second output from digital comparator 14, this output being generated whenever the detected speed is below ⅛ mph. Thus, if the detected speed is below this threshold, the output of the selection circuit 26 will be the 20 second time interval rather than the normal 120 second time interval which is selected by selection circuit 22. The output of the selection circuit 26 is supplied to the monitoring circuit, as before.

While the invention has been described in terms of a single preferred embodiment, those skilled in the art will recognize that the invention can be practiced with modification within the spirit and scope of the appended claims. For example, the hardware implementation shown in FIG. 3 may be readily implemented in software running on a microprocessor. For engineman monitoring devices which include a microprocessor, such software implementation could be desirable for limiting component count. Moreover, the various speed ranges may be changed, depending on a specific application. For example, the ⅛ mph threshold may vary depending on other additional loads on the axle drive; however, our intention is to make the threshold as low as practical. It is also possible to combine the two outputs of the comparator 14 in the absence of a drag input to provide the select input to the selection circuit 26; that is, the 20 second time interval would be selected at speeds less than or equal to 3½ mph whenever there is no drag input.

Having thus described our invention, what we claim as new and desire to secure by Letters Patent is as follows:

1. In an engineman monitoring device for a vehicle including means for monitoring operations performed by an engineman and generating a reset signal in response to the performance of a monitored operation, an improved timer circuit for selecting a drag operation comprising:
   means for measuring the speed of the vehicle and generating a speed signal;
   comparing means for comparing said speed signal with a predefined range of speeds and generating an output signal when said speed signal is within said predefined range;
   drag select means, operable by an engineman, for generating a drag select output; and
   timing means responsive to the output comparing means and said drag select output for normally generating a first timing signal having a first predefined timing interval but when both the output of said comparing means and said drag select output are simultaneously present, generating a second timing signal having a second predefined timing interval longer than said first timing interval, said timing means being reset by said reset signal.

2. The improved timer circuit recited in claim 1 wherein said comparing means comprising:
   clock signal generating means for generating clock pulses having a fixed frequency; and
   digital comparing means responsive to said square wave signal and said clock pulses for generating an output when the speed of the vehicle is within said predefined range.

3. The improved timer circuit recited in claim 1 wherein said timing means comprises:
gate means enabled by the output of said comparing means and, when enabled, producing a select output in response to said drag select output;
select means responsive to said select output for passing as an output to said monitoring device said second timing signal, but otherwise passing said first timing signal; and
timer means reset by said reset signal for generating first and second timing signals respectively connected to first and second time interval inputs of said select means.

4. The improved circuit recited in claim 3 wherein said means for measuring the speed of a vehicle comprises:
axle driven means for generating a sinusoidal output signal having a frequency proportional to the speed of the vehicle; and
squaring means responsive to said sinusoidal output signal for generating a square wave signal of the same frequency.

5. The improved circuit recited in claim 4 wherein said comparing means comprises:
clock signal generating means for generating clock pulses having a fixed frequency; and
digital comparing means responsive to said square wave signal and said clock pulses for generating an output when the speed of the vehicle is within said predefined range.

6. The improved circuit recited in claim 1 wherein said comparing means generates a second output whenever said speed signal is below a predetermined threshold, said circuit further comprising selector means enabled by said second output for selecting a third timing signal having a timing interval shorter than said first timing interval.

7. The improved circuit recited in claim 6 wherein said timing means comprises:
gate means enabled by the first output of said comparing means and, when enabled, producing a select output in response to said drag select output;
first select means responsive to said select output for passing as an output said second timing signal, but otherwise passing said first timing signal;
second select means responsive to the second output of said comparing means for passing as an output to said monitoring device said third timing signal, but otherwise passing the output of said first select means; and
timer means reset by said reset signal for generating first, second and third timing signals, said first and second timing signals being respectively connected to first and second time interval inputs of said first select means and said third timing signal being connected to one input of said second select means.

8. A method for supplying different timing signals to an engineman monitoring device, said monitoring device monitoring operations performed by an engineman to control a vehicle and generating a reset signal in response to the performance of a monitored operation, said method comprising the steps of:
measuring the speed of the vehicle;
comparing the measured speed of the vehicle to a predefined range of speeds;
generating a drag select signal in response to an engineman drag select input;
generating a first timing signal having a first predefined timing interval;
generating a second timing signal having a second predefined timing interval; and
selecting said second timing signal when said measured speed is within said predefined range and said drag select signal is present, otherwise selecting said first timing signal.

9. The method recited in claim 8 further comprising the step of resetting the generation of said first and second timing signals in response to said reset signal.

10. The method recited in claim 8 further comprising the steps of:
generating a third timing signal having a third predefined timing interval less than said first timing interval;
comparing the measured speed of the vehicle to a minimum threshold speed below said predefined range of speeds; and
if the measured speed is less than said threshold, selecting said third timing signal and inhibiting the selection of either of said first or second timing signals.

* * * * *